United States Patent
Pace et al.

(10) Patent No.: US 8,238,741 B2
(45) Date of Patent: Aug. 7, 2012

(54) STEREO CAMERA PLATFORM AND STEREO CAMERA

(75) Inventors: Vincent Pace, Shadow Hills, CA (US); Patrick Campbell, Stevenson Ranch, CA (US)

(73) Assignee: James Cameron & Vincent Pace, Burbank, CA (US)

( * ) Notice: Subject to any disclaimer, the term of this patent is extended or adjusted under 35 U.S.C. 154(b) by 146 days.

(21) Appl. No.: 12/752,085

(22) Filed: Mar. 31, 2010

(65) Prior Publication Data

US 2011/0085788 A1   Apr. 14, 2011

Related U.S. Application Data

(63) Continuation-in-part of application No. 12/410,395, filed on Mar. 24, 2009, now Pat. No. 7,933,512.

(51) Int. Cl.
G03B 35/00 (2006.01)
G03B 17/00 (2006.01)
G03B 41/00 (2006.01)
G03B 13/00 (2006.01)
H04N 13/02 (2006.01)

(52) U.S. Cl. ............ 396/325; 396/79; 396/85; 396/333; 348/47; 348/240.99; 348/345

(58) Field of Classification Search .................. 396/325, 396/79, 85, 89, 322, 324, 331, 333; 348/42, 348/47, 240.99, 345
See application file for complete search history.

(56) References Cited

U.S. PATENT DOCUMENTS

| | | | |
|---|---|---|---|
| 4,557,570 A | 12/1985 | Hines | |
| 4,650,305 A | 3/1987 | Hines | |
| 4,725,863 A | 2/1988 | Dumbreck et al. | |
| 4,751,570 A | 6/1988 | Robinson | |
| 4,881,122 A | 11/1989 | Murakami | |
| 4,999,713 A | 3/1991 | Ueno et al. | |
| 5,140,415 A | 8/1992 | Choquet | |
| 5,175,616 A | 12/1992 | Milgram | |
| 5,740,337 A | 4/1998 | Okino et al. | |
| 6,414,709 B1 | 7/2002 | Palm et al. | |
| 6,512,892 B1 | 1/2003 | Montgomery et al. | |
| 6,701,081 B1 | 3/2004 | Dwyer et al. | |
| 6,791,598 B1 | 9/2004 | Luken | |
| 6,798,406 B1 | 9/2004 | Jones et al. | |
| 7,190,389 B1 | 3/2007 | Abe et al. | |
| 7,899,321 B2 | 3/2011 | Cameron et al. | |
| 2005/0041095 A1 | 2/2005 | Butler-Smith et al. | |
| 2006/0204240 A1 | 9/2006 | Cameron et al. | |
| 2007/0140682 A1 | 6/2007 | Butler-Smith et al. | |
| 2007/0146478 A1 | 6/2007 | Butler-Smith et al. | |

OTHER PUBLICATIONS

Unknown, 21st Century 3D Introduces Uncompressed 4:4:4 Stereoscopic Camera System—3DVX3, SPIE Stereoscopic Displays and Applications Conference; avail. Http://www.21stcentury3d.com/press/pr-060117-3dvx3.html; accessed Sep. 11, 2008, 3pp.
Unknown, 21st Century 3D Introduces New Digital Sterescopic Motion Picture Camera System, http://fullcamera.com/article/cfm/id/281457, accessed Sep. 11, 2008, 2pp.
Matt Hurwitz, Dreaming in 3D, CineGear Expo News, The Official CineGear Expo Show Newspaper, Jun. 3-5, 2005, pp. 18-19.
WIPO, International Search Report for International Application No. PCT/US/2010/027019, mail date May 11, 2010.

*Primary Examiner* — Rochelle-Ann J Blackman
(74) *Attorney, Agent, or Firm* — SoCal IP Law Group LLP; John E. Gunther; Steven C. Sereboff

(57) ABSTRACT

There is disclosed a platform for a stereographic camera system, a stereographic camera, and a method for operating a stereographic camera. The platform may include a first linear motion mechanism and a second linear motion mechanism. A camera mounting plate may be rotatably coupled to the first linear motion mechanism at a first rotation axis and rotatably coupled to the second linear motion mechanism at a second rotation axis.

12 Claims, 11 Drawing Sheets

STEREO CAMERA PLATFORM AND STEREO CAMERA

RELATED APPLICATION INFORMATION

This patent is a continuation-in-part of application Ser. No. 12/410,395, filed Mar. 24, 2009, entitled Stereo Camera With Controllable Pivot Point, which is incorporated herein by reference.

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on objects afar, our eyes rotate towards a parallel view. The angle between the lines of sight of each eye is commonly termed the convergence angle. The convergence angle is higher when we view objects closer to our eyes and lower when viewing distant objects. The convergence angle may be essentially zero, indicating essentially parallel lines of sight, when we view objects at great distance.

Three dimensional imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of a second polarization state. This technique has been used to present 3-D movies.

A second approach to displaying stereographic images is to form the left-eye and right-eye images alternately on a common viewing screen at a high rate. The images may then be viewed using shutter glasses that alternately occult either the right or left eye in synchronism with the alternating images.

Throughout this description, elements appearing in figures are assigned three-digit reference designators, where the most significant digit is the figure number where the element was first described, and the two least significant digits are specific to the element. An element that is not described in conjunction with a figure may be presumed to have the same characteristics and function as a previously-described element having the same reference designator. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
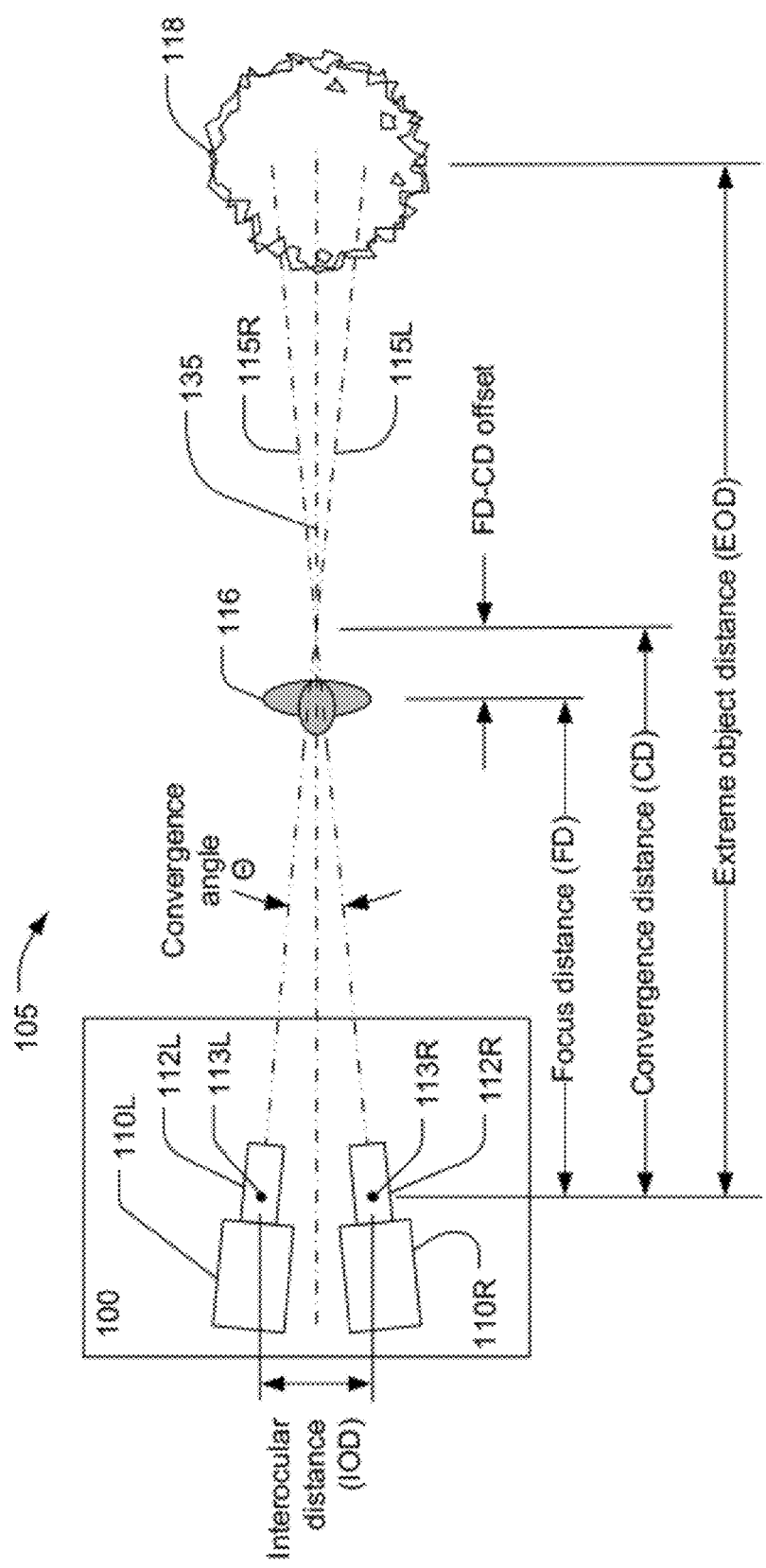
FIG. 1 is a schematic drawing of a stereographic camera in an environment.

Referring now to FIG. 1, a stereographic camera 100 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. The left and right cameras 110L, 110R may be separated by an interocular distance IOD. Each of the left and right cameras 110L, 110R may include a lens 112L, 112R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 110L, 110R.

The cameras 110L, 110R may be disposed such that the axes 115L, 115R are parallel or such that a convergence angle $\Theta$ is formed between the two axes 115L, 115R. The cameras 110L, 110R may be disposed such that the axes 115L, 115R cross at a convergence distance CD from the cameras. The interocular distance IOD, the convergence distance CD, and the convergence angle $\Theta$ are related by the formula $$\Theta = 2 A \operatorname{TAN}(IOD/2CD), \text{ or} \quad (1)$$

$$CD = IOD/[2 \operatorname{TAN}(\Theta/2)]. \quad (2)$$

The interocular distance IOD and the convergence distance CD may be measured from a nodal point within the lenses 112L, 112R. The convergence angle Θ may be set by rotating each of the cameras 110L, 110R about a corresponding pivot axis 113L, 113R. A line of sight 135 of the stereographic camera 100 may bisect the convergence angle Θ and may bisect the interocular distance IOD.

The stereographic camera 100 may be used to form a stereographic image of a scene 105. As shown in the simplified example of FIG. 1, the scene 105 may include a primary subject 116, which is shown, for example, as a person. The scene 105 may also include other features and objects in the background (behind the primary subject). The distance from the cameras 110L, 110R to the furthest background object 118, which is shown, for example, as a tree, may be termed the extreme object distance EOD.

When the images from a stereographic camera, such as the stereographic camera 100, are displayed on a viewing screen, scene objects at the convergence distance will appear to be in the plane of the viewing screen. Scene objects, such as the primary subject 116 in the example of FIG. 1, located closer to the stereographic camera may appear to be in front of the viewing screen. Scene objects, such as the tree 118, located further from the stereographic camera may appear to be behind the viewing screen.

Each lens 112L, 112R may have adjustable focus. Both lenses 112L, 112R may be focused at a common adjustable focus distance FD. The focus distance FD may be adjusted manually, or may be automatically adjusted. The focus distance FD may be adjusted such that the cameras 110L, 110R are focused on the primary subject 116. The focus distance may be automatically adjusted in response to a sensor (not shown) that determines the distance from the cameras 110L, 110R to the primary subject 116. The sensor to determine the distance from the cameras to the primary subject may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 116. However, as shown in FIG. 1, the convergence distance CD and the focus distance FD may be different. For example, the focus distance FD may be set at the distance from the cameras to the primary subject and the convergence distance CD may be set slightly longer than the focus distance. In this case, when the images are displayed, the primary subject will be seen to be in front of the plane of the viewing screen.

Each lens 112L, 112R may also have zoom capability, which is to say that the focal length FL of each lens may be adjusted. Both lenses 112L, 112R may always have precisely the same focal length. The focal length adjustment of the two lenses 112L, 112R may be coupled mechanically, electrically, electronically, electromechanically, or by another coupling mechanism. Commonly, the focal length of the lenses 112L, 112R may be adjusted manually. The focal length of the two lenses 112L, 112R may also be adjusted automatically in accordance with a predetermined scenario.

Figure 2:
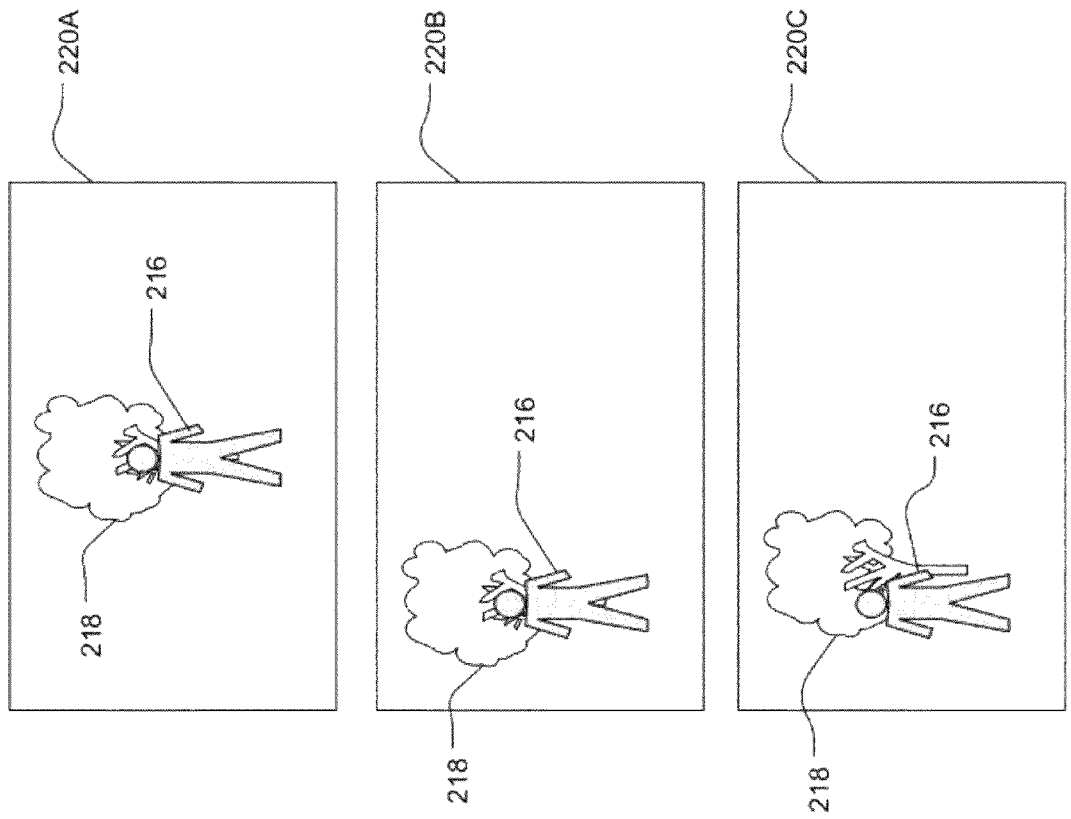
FIG. 2A is a representation of an image captured by a camera.
FIG. 2B is a representation of an image captured by a camera.
FIG. 2C is a representation of an image captured by a camera.

Referring now to FIG. 2A, an image 220A captured by a camera, which may be one of the cameras 110L, 110R, or another camera, may show a scene including a first object 216 directly in front of a second object 218. FIG. 2B shows an image 220B of the same scene after the camera has been rotated about a pivot axis which passes through a nodal point of the camera lens. The first object 216 and second object 218 are now positioned to the left side of the image with the first object 216 still directly in front of the second object 218. A "nodal point" is a point on the axis of a camera lens about which the camera and lens may be rotated without introducing parallax into the image captured by the camera. FIG. 2C shows an image 220C of the scene of FIG. 2A after the camera has been rotated about an axis that does not pass through a nodal point. The first object 216 and second object 218 are now positioned to the left side of the image but are no longer in a direct line.

Stereography relies on the differences in position of objects within a pair of images to provide an illusion of depth. As shown in FIG. 2C, parallax may be introduced if one or both of the cameras of a stereographic camera system are rotated about an axis that does not pass through a nodal point. Such parallax may cause undesired shifts in the apparent depths of objects in a stereographic image. To avoid introducing parallax, the convergence angle of a stereographic camera system may be set by rotating one or both cameras about respective pivot axes that pass through nodal points of the respective lenses.

Figure 3:
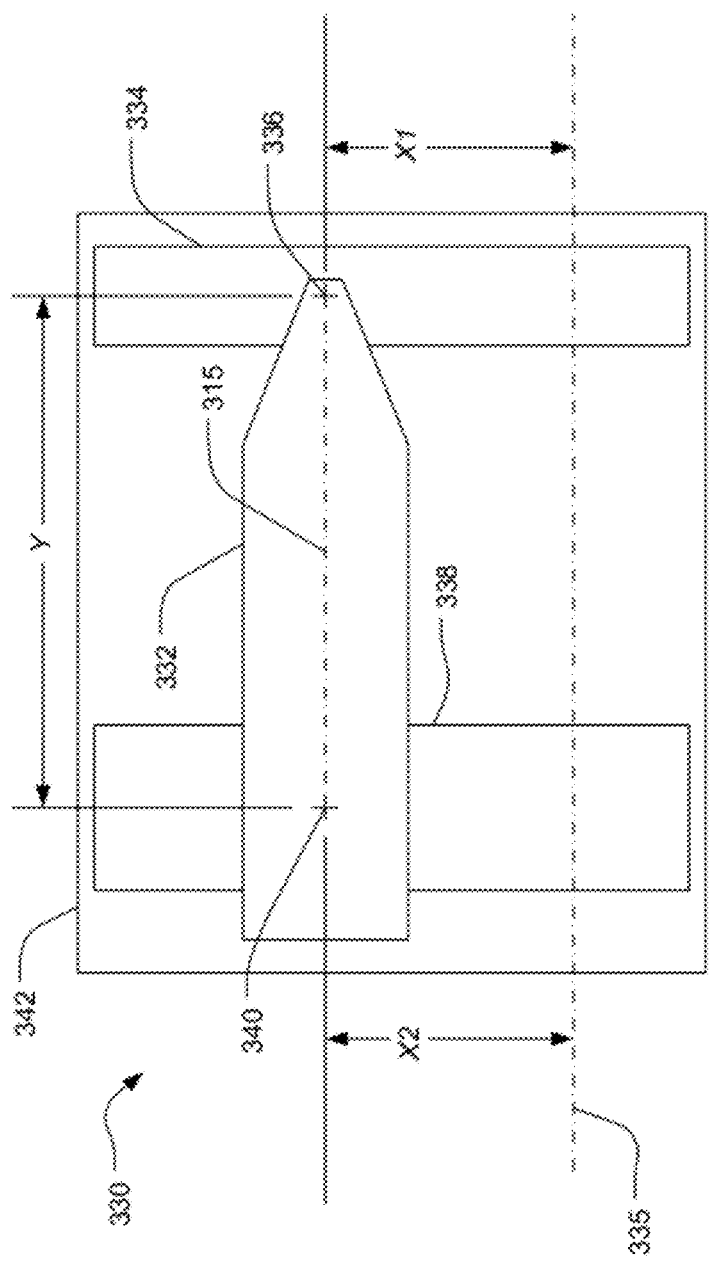
FIG. 3 is a schematic top view of a camera platform.

Referring now to FIG. 3, a platform 330 for a stereographic camera may allow an angle between an optical axis of a camera 315 and a line of sight 335 to be set by rotating the camera about a virtual pivot axis. The platform 330 may also allow varying the position of the camera transverse to the line of sight 335.

The platform 330 may include a camera mounting plate 332. The camera mounting plate 332 may be rotatably coupled to a first linear motion mechanism 334 at a first rotation axis 336. The camera mounting plate may also be rotatably coupled to a second linear motion mechanism 338 at a second rotation axis 340. The first linear motion mechanism 334 and the second linear motion mechanism 338 may be attached to a common base 342.

In this patent, the phrase "rotatably coupled" means attached in a manner that allows one element to rotate with respect to a second element. Similarly, the phrase "translatably coupled" means attached in a manner that allows one element to translate linearly with respect to a second element. The phrase "rotatably coupled at a specific rotation axis" means attached in a manner that allows one element to rotate about the specified rotation axis with respect to a second element.

Specifically, the camera mounting plate 332 may be rotatably coupled to the first linear motion mechanism 334 such that the camera mounting plate 332 may rotate, with respect to the first linear motion mechanism 334, about a first rotation axis 336. The camera mounting plate 332 may be rotatably coupled to the second linear motion mechanism 338 such that the camera mounting plate 332 may rotate, with respect to the second linear motion mechanism 338, about a second rotation axis 340. The distance between the first rotation axis 336 and the second rotation axis 340 may be equal to a predetermined distance Y.

In this patent, the term "mechanism" refers to a combination of mechanical, electrical, and electromechanical components including at least one component movable with respect to other components and an actuator which causes relative motion of the movable component. The relative motion may be linear, angular, a combination or linear and angular, or some other movement. The movable components may be coupled by rotary or linear slides, bearings, bushings, or other devices. The actuator may be a motor or a manually operated lever, knob, crank, ring, or other device. The actuator may be all or a portion of one of the movable components, or may be coupled to the movable components by way of one or more gears, belts, links, and other devices. Examples of mechanisms include motorized linear or rotational motion stages and manual or motorized systems currently used to adjust focus and aperture on cinematic camera lenses.

The first linear motion mechanism 334 may be configured to set a distance X1, normal to the line of sight 335, between the first left axis 336 and the line of sight 335. The first linear motion mechanism 334 may, for example, include a first linear motion stage aligned to move along an axis normal to the line of sight 335. The first linear motion stage may be coupled to a first motor (not shown) which may be controlled to adjust the distance X1.

The second linear motion mechanism 338 may be configured to set a distance X2, normal to the line of sight 335, between the second rotation axis 340 and the line of sight 335. The second linear motion mechanism 384 may, for example, include a second linear motion stage aligned to move along an axis normal to the line of sight 335. The second linear motion stage may be coupled to a second motor (not shown) which may be controlled to adjust the distance X2.

The camera mounting plate 332 may include provisions, not shown in FIG. 3, to mount a camera (not shown). The provisions for mounting the camera may depend on the type of camera to be mounted. For example, the camera mounting plate 332 may have one or more holes to allow a camera to be attached using bolts or other fasteners. For further example, the camera mounting plate 332 may include one or more dovetail rails which capture mating rails on the camera. Additionally, the camera mounting plate 332 may include a screw or cam mechanism to lock a camera onto the one or more dovetail rails. The camera mounting plate 332 may include other features and/or structures to mount a camera.

The camera mounting plate 332 may be configured such that, when a camera is mounted to the camera mounting plate, the optical axis 315 of the camera will intersect the first rotation axis 336 and the second rotation axis 340. As shown in FIG. 3, when the first linear motion mechanism 334 and the second linear motion mechanism 338 are controlled to set X1=X2, the optical axis 315 of a camera attached to the mounting plate may be parallel to the line of sight 335. The first linear motion mechanism 334 and the second linear motion mechanism 338 may be controlled to set X1 and X2 to zero, in which case the optical axis 315 of the camera attached to the mounting plate may be coincident with the line of sight 335.

Figure 4:
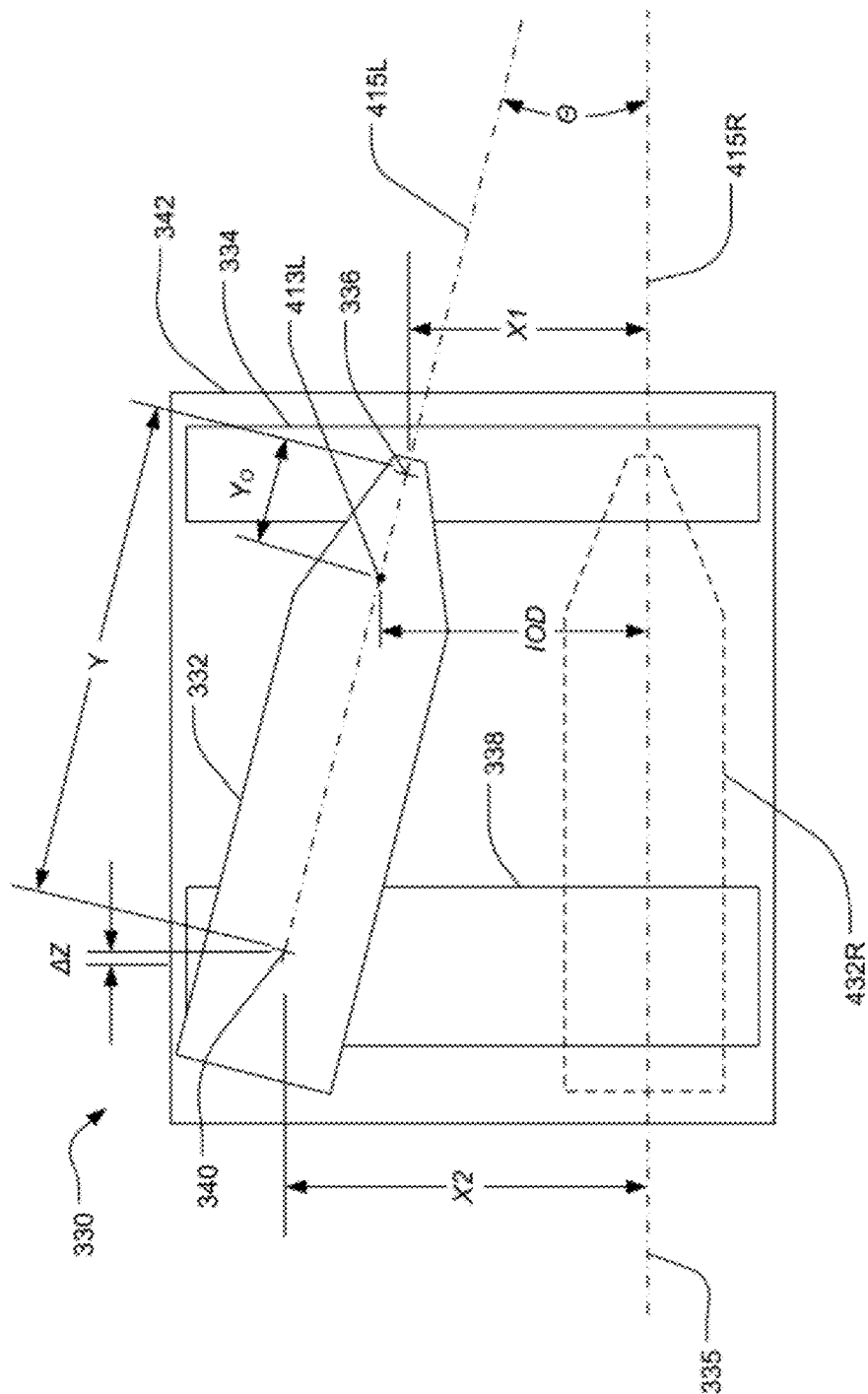
FIG. 4 is a schematic top view of a camera platform.

FIG. 4 shows an example of how the first linear motion mechanism 334 and the second linear motion mechanism 338 of the camera platform 330 may be used to set a desired interocular distance IOD and a desired convergence angle $\Theta$ between a left camera mounting to the camera mounting plate 332 and a right camera mounted to a right camera mounting plate 432R of a stereographic camera system. The left and right cameras are not shown in FIG. 4 but are represented by left and right optical axis 415L, 415R. In the example of FIG. 4, the right camera mounting plate is stationary with respect to the line of sight 335 and positioned such that an optical axis 415R of the right camera is coincident with the line of sight 335. The IOD is defined between a virtual pivot axis 413L of the left camera and the line of sight/optical axis of the right camera 335/415R. The virtual pivot axis 413L may be defined to pass through nodal points of a lens of the left camera.

In the example of FIG. 4, the distance X2, as set by the second linear motion mechanism, is larger than that shown in FIG. 3, and the distance X1 is the same as that shown in FIG. 3. Since X2 is not equal to X1, the left camera optical axes 415L is not parallel to the line of sight 335. Thus the left and right camera optical axes 415L and 415R may converge at a convergence angle $\Theta$.

When a stereographic camera is used to record a scene, the desired convergence angle may be set such that the optical axes of the left and right cameras converge at a specific convergence distance. The convergence distance may be equal to or based on the distance from the stereographic camera to a primary object in the scene. This distance may be determined, for example, by the focus distance of the camera lenses as set by a camera operator, or by some other method. Additionally, the desired IOD may be fixed, for example by a cinematographer, prior to recording the scene. Alternatively, the IOD may be automatically controlled during the recording of the scene. For example, pending application Ser. No. 12/409,316 and pending application Ser. No. 12/578,488, both entitled Stereo Camera with Automatic Control of Interocular Distance, describe cameras and methods for setting interocular distance in near-real time to maintain a predetermined maximum disparity.

In the example of FIG. 4, the first linear motion mechanism 334 and the second linear motion mechanism 338 may be used to collectively set the IOD and $\Theta$ in accordance with the following formulas.

$$X1 = IOD - Y_O\sin(\Theta) \tag{3}$$

$$X2 = X1 + Y\sin(\Theta) \tag{4}$$

$$= IOD + (Y - Y_O)\sin(\Theta) \tag{5}$$

wherein: IOD=a desired interocular distance defined between the left virtual pivot axis 413L and the line of sight/optical axis of the right camera 335/415R;
$\Theta$=a desired convergence angle between the left and right camera optical axes 415L, 415R;
X1=the distance set by the first linear motion mechanism 334;
X2=the distance set by the second linear motion mechanism 338;
Y=the distance that separates the first rotation axis 336 and the second rotation axis 340;
$Y_O$=a distance that separates the virtual pivot axis 413L from the first rotation axis 336.

As the convergence angle $\Theta$ is changed by changing one or both of the distances X1 and X2, at least one of the first rotation axis 336 and the second rotation axis 340 may need to translate parallel to the line of sight 335. Assuming that the first rotation axis does not move parallel to the line of sight, and assuming the distance Y between the first rotation axis and the second rotation axis is fixed by the camera mounting plate, the second rotation axis must move in accordance with the formula:

$$\Delta Z = Y[1-\cos(\Theta)] \tag{6}$$

where $\Delta Z$=the distance, parallel to the line of sight 335, that the second rotation axis moves from its position when $\Theta$=0.

To allow the necessary motion parallel to the line of sight, the camera mounting plate 332 may be both rotatably coupled and translatably coupled to the second linear motion mechanism 338. Alternatively, the second linear motion mechanism 338 may be translatably coupled to the base 342.

Figure 5:
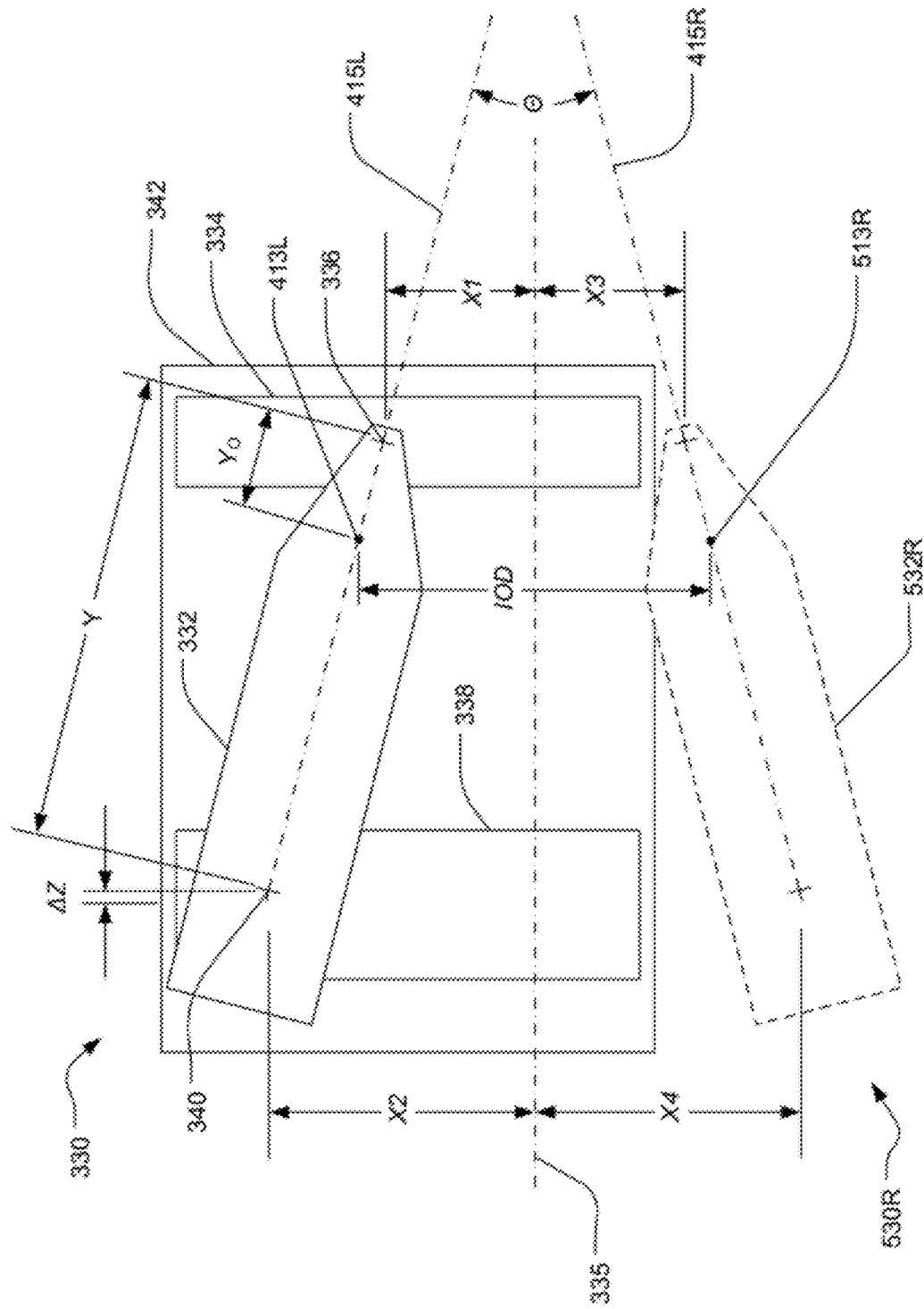
FIG. 5 is a schematic top view of a camera platform.

FIG. 5 shows an example where the first linear motion mechanism 334 and the second linear motion mechanism 338 of the camera platform 330 are used, in combination with a second camera platform 530R, to set a desired interocular distance IOD and a desired convergence angle ⊖ between left and right cameras of a stereographic camera system. Only a second camera mounting plate 532R of the second camera platform 530R is shown in FIG. 5. The second camera platform 530R may be identical to, or a mirror image of, the camera platform 330. The left and right cameras are not shown in FIG. 5 but are represented by left and right optical axis 415L, 415R. The IOD is defined between virtual pivot axes 413L, 513R. The virtual pivot axes 413L, 513R may be defined to pass through nodal points of the lenses of the left and right cameras, respectively.

In the example of FIG. 5, the distance X2, as set by the second linear motion mechanism, is larger than that shown in FIG. 3, and the distance X1 is the same as that shown in FIG. 3. Since X2 is not equal to X1, the camera optical axes 415L is not parallel to the line of sight 335. Assuming that distances X3 and X4 are similarly set by the second camera platform 530R, the left and right camera optical axes 415L and 415R may converge at the desired convergence angle ⊖.

In the example of FIG. 5, the first linear motion mechanism 334 and the second linear motion mechanism 338 may be used, in combination with the second camera platform 530R, to collectively set the IOD and ⊖ in accordance with the following formulas.

$$X1 = X3 = 0.5\,IOD - Y_O\sin(\Theta/2) \quad (7)$$

$$X2 = X4 = X1 + Y\sin(\Theta/2) \quad (8)$$

$$= 0.5\,IOD + (Y - Y_O)\sin(\Theta/2) \quad (9)$$

wherein: IOD=a desired interocular distance defined between the left virtual pivot axis 413L and the right virtual pivot axis 413R;
⊖=a desired convergence angle between the left and right camera optical axes 415L, 415R;
X1=the distance set by the first linear motion mechanism 334;
X2=the distance set by the second linear motion mechanism 338;
X3, X4=distances set by the second camera platform 330R;
Y=the distance that separates the first rotation axis 336 and the second rotation axis 340;
$Y_O$=a distance that separates the virtual pivot axes 413L, 513R from the respective first rotation axes.

Figure 6:
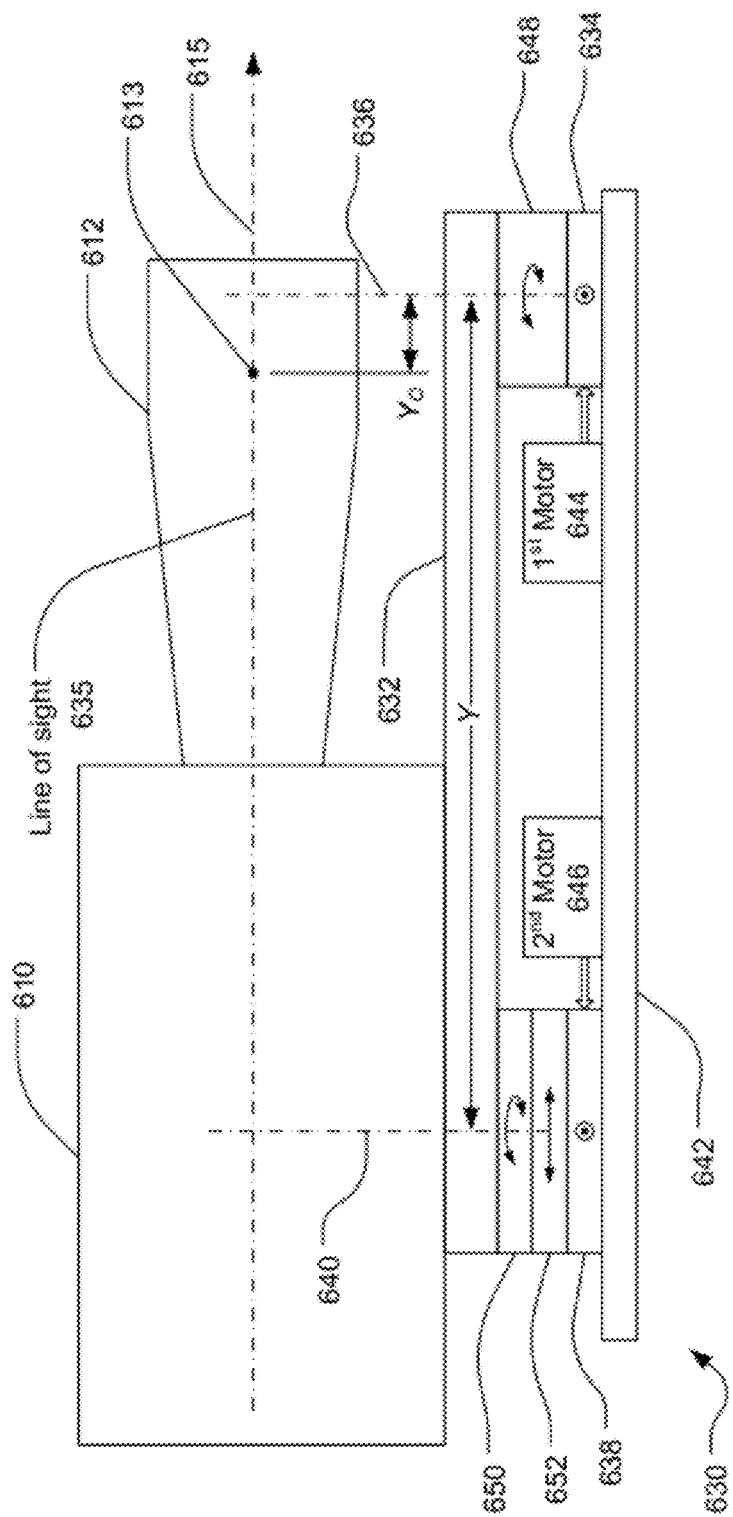
FIG. 6 is a schematic side view of a portion of a camera platform.

FIG. 6 shows a schematic side view of a stereographic camera 600 which includes a camera 610 and an associated lens 612 and a camera platform 630, which may be the camera platform 330. The schematic view shows the general relationships between the functional components of the stereographic camera 600 without attempting to show any structural detail. The camera platform 630 may include a camera mounting plate 632, a base 642, and a plurality of motion devices coupling the camera mounting plate 632 to the base 642. The camera 610 may be attached to the camera mounting plate 632 by one or more screws, clamps, dovetail rails, or other devices, none of which are shown in FIG. 6. The lens 612 may be supported, at least in part, by the camera 610. The lens 612 may also be supported, in part, directly by the camera mounting plate 632.

A first linear motion mechanism 634 may be mounted to the base 642. A movable portion of the first linear motion mechanism 634 may move normal to a line of sight 635, which is to say that the movable portion of the first linear motion mechanism may move transverse to the plane of FIG. 6. The movable portion of the first linear motion mechanisms 634 may move under control of a first motor 644. The first linear motion mechanism 634 may be constrained from motion parallel to the line of sight 635.

The camera mounting plate 632 may be rotatably coupled to the movable portion of the first linear motion mechanism 634 at a first rotation axis 636. The camera mounting plate 632 may be rotatably coupled to the movable portion of the first linear motion mechanism 634 by a first rotation device 648 that allows the camera mounting plate to rotate about the first rotation axis 636. The rotation device 648 may be, for example, a rotary stage or a pin or shaft that rotates within a bushing or bearing.

A second linear motion mechanism 638 may be mounted to the base 642. A movable portion of the second linear motion mechanism 638 may move normal to the line of sight 635. The movable portion of the second linear motion mechanism 638 may move under control of a second motor 646. The second linear motion mechanism 638 may be constrained from motion parallel to the line of sight 635.

The camera mounting plate 632 may be rotatably coupled to the movable portion of the second linear motion mechanism 638 at a second rotation axis 650. The camera mounting plate 632 may be rotatably coupled to the movable portion of the second linear motion mechanism 638 by a second rotation device 650 that allows the camera mounting plate to rotate about the second rotation axis 640. The second rotation device 650 may be, for example, a pin or shaft that rotates within a bushing or bearing. The second rotation device 650 may be a rotary stage configured to support a majority of the weight of the camera mounting plate 632, the camera 610, and the lens 612.

A third linear motion device 652 may be coupled between the second rotation device 650 and the second linear motion mechanism 638. The third linear motion device 652 may allow the second rotation device 650 and the second rotation axis 640 to translate parallel to the line of sight 635. The third linear motion device 652 may thus translatably couple the camera amounting plate 632 to the second linear motion mechanism 638. The third linear motion device 652 and the second linear motion mechanism 638 may be, for example, portions of a crossed motion stage such as a crossed roller stage.

The first rotation device 648, the second rotation device 650, and the third linear motion device 650 may not be driven by respective motors, but may be free to move sympathetically with movements of the first and second linear motion mechanisms 635 and 638.

Figure 7:
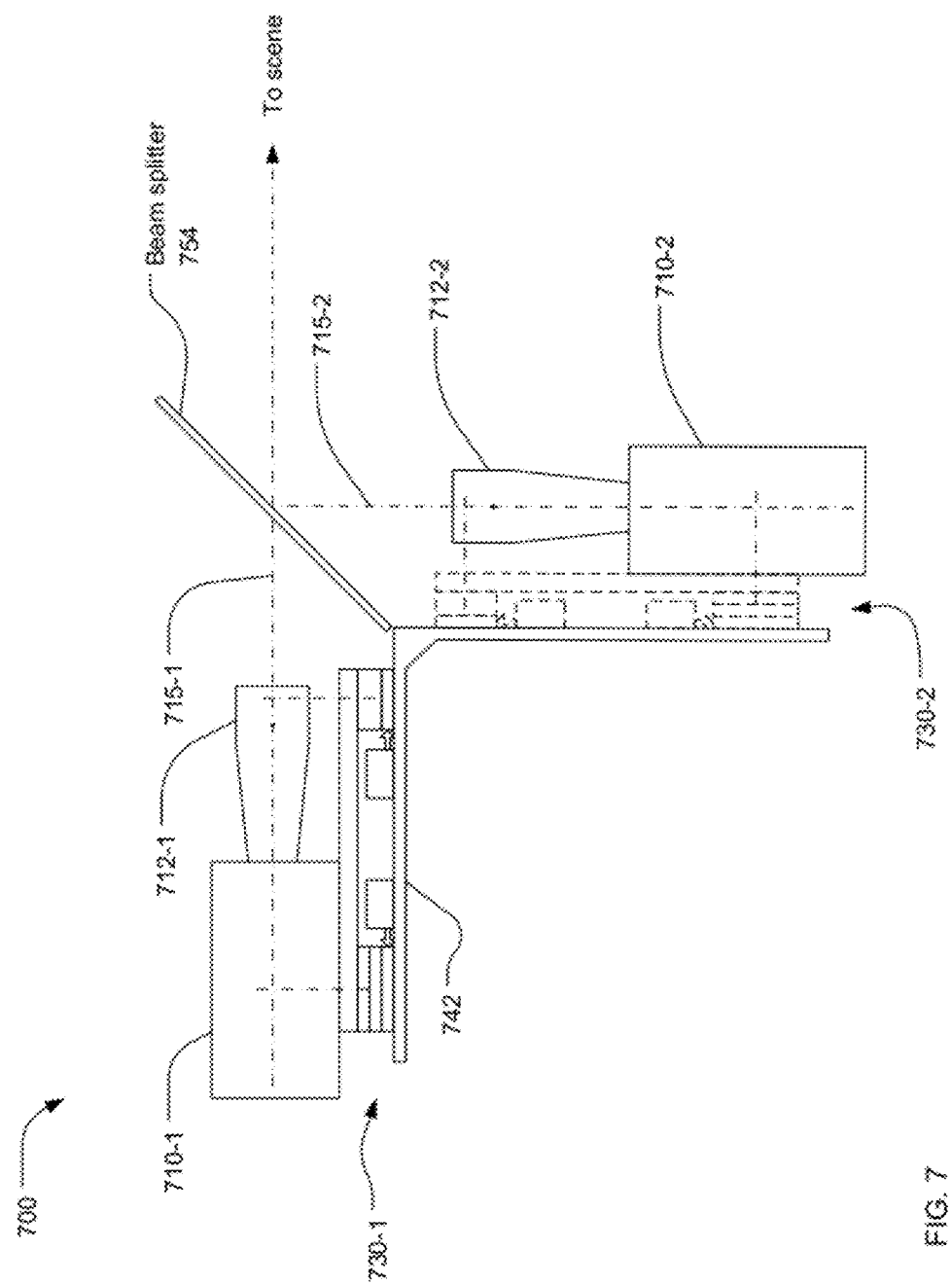
FIG. 7 is a schematic side view of a stereographic camera.

A stereographic camera system may include two cameras mounted on respective camera platform disposed side-by-side. With a side-by-side arrangement, a minimum interocular distance may be determined by physical interference of the two cameras and/or camera platforms. An alternative configuration for a stereographic camera 700, which may not constrain the minimum interocular distance, is shown in FIG. 7. A first camera 710-1 and an associated first lens 712-1 may be mounted on a first camera platform 730-1, which may be the camera platform 330. A second camera 710-2 and an associated second lens 712-2 may be mounted such that an optical axis 715-2 of the second camera forms an angle with the optical axis 715-1 of the first camera. The second camera 710-2 may be mounted on a second camera platform 730-2. The second camera mounting platform 730-2 may be identical to, or a minor image of, the first camera mounting platform 730-1, or the second camera platform may include a fixed camera mounting plate such that the second camera 710-2 is mounted in a fixed location. The first camera platform 730-1 and the second camera platform 730-2 may be mounted to, or may share, a common base 742.

The first camera may be the left or right camera of the stereographic camera system 700, and the second camera the other camera of the stereographic camera system 700. A beam splitter 754 may be disposed along the optical axis 715-1 of the first camera 710-1. The beam splitter 754 may be configured to transmit about 50% of light received from a scene and to reflect about 50% of the light received from the scene. The first camera 710-1 may receive the light transmitted through the beam splitter. The second camera 710-2 may be disposed to receive the light reflected by the beam splitter. The beam splitter may effectively fold the optical axis 715-2 of the second camera 710-2.

The first camera platform 730-1 and the second camera platform 730-2 may be mounted to a common support structure which is not shown in FIG. 7. The first camera platform 730-1 and the second camera platform 730-2 may be physically separated by a sufficient distance to allow the positions and angles of at least one of the cameras to be freely adjusted normal to plane of FIG. 7 without mechanical interference of the cameras, lenses or platforms. In FIG. 7, the beam splitter is shown disposed at a 45-degree angle to the first optical axis 715-1, such that the angle between the first and second optical axis 715-1, 715-2 is about 90 degrees. Other angles may be used so long as the necessary physical separation between the cameras, lenses and platforms is maintained.

Figure 8:
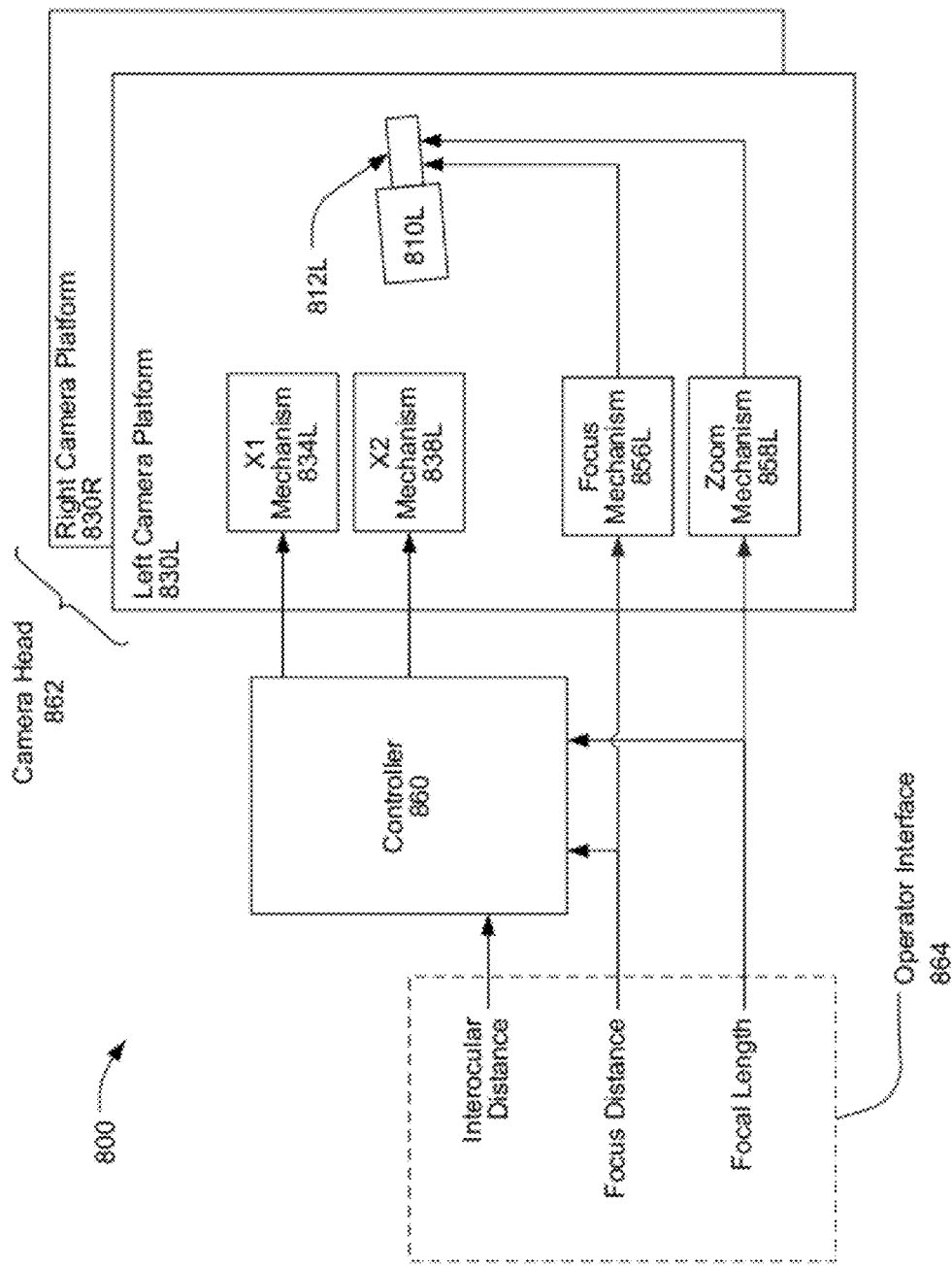
FIG. 8 is a block diagram of a stereographic camera system.

Referring now to FIG. 8, a stereographic camera system 800, which may be suitable for use as the camera 100 shown in FIG. 1, may include a camera head 862 coupled to a controller 860. The camera head 862 may include a left camera 810L and a right camera (not visible). At least one of the left camera 810L and the right camera may be moveable to set an interocular distance and convergence angle between the left and right cameras. platform 830L and a right camera platform 830R. In the example of FIG. 8, it is assumed that the left camera is movable, and the right camera is movable or stationary. This example does not preclude a configuration where the left camera 810L is stationary and the right camera is movable.

The left camera 810L and an associated lens 812L may be mounted on a camera platform 830L, which may be the camera platform 330 of FIG. 3. The right camera and an associate right lens (not shown) may be mounted on a right camera mounting platform 830R. The right camera mounting platform 830R may be similar to, or a mirror image of, the left camera mounting platform 830L. The right camera mounting platform 830R may support the right camera in a fixed position.

The left camera platform 830L and, in some configuration, the right camera mounting platform 830R may include a plurality of mechanisms to adjust the position and/or orientation of the left camera 810L. Both the left camera platform 830L and the right camera mounting platform 830R may include mechanisms to adjust characteristics of the left lens 812L and the right lens.

The left camera platform 830L may include an X1 mechanism 834L and an X2 mechanism 838L to adjust, at least in part, an interocular distance and a convergence angle between the left camera 810L and the right camera. The X1 mechanism 834L and the X2 mechanism 838L may include one or more movable platforms or stages coupled to motors or other actuators.

In the configuration where the right camera is fixed in position, the X1 mechanism 834L and the X2 mechanism 838L may be used in combination to set the interocular distance, the convergence angle, and the relative location of the pivot axes, as described in conjunction FIG. 4. The X1 mechanism 834L and the X2 mechanism 838L may set the interocular distance, the convergence angle, and the relative location of the pivot axes in response to data received from the controller 860 in accordance with formulas (3), (4), and (5). Within this patent, the term "data" is intended to include digital data, commands, instructions, digital signals, analog signals, optical signals and any other data that may be used to communicate the value of a parameter such as an interocular distance or a convergence angle.

In a configuration where the right camera is movable, the right camera platform 830R may include an X3 mechanism (not shown) and an X4 mechanism (not shown) to set dimensions X3 and X4 as shown in FIG. 5. The X1 mechanism 834L, the X2 mechanism 838L and the X3 and X4 mechanisms may be used in combination to set the interocular distance, the convergence angle, and the relative location of the pivot axes, as described in conjunction FIG. 4. The X1 mechanism 834L and the X2 mechanism 838L may set the interocular distance, the convergence angle, and the relative location of the pivot axes in response to data received from the controller 860 in accordance with formulas (7), (8), and (9).

The left camera platform 830L may include a focus mechanism 856L to adjust and set the focus distance of the left lens 812L. The right camera platform 830R may contain a comparable focus mechanism to adjust and set the focus distance of the right lens. The focus mechanism 856L may include a mechanical, electronic, electrical, or electro-mechanical linkage between the left and right lenses to simultaneously adjust the focus distance of both lenses to the same value. The focus mechanism 856L may include a motor or other actuator adapted to set the focus distance in response to data received from the controller 860. The focus mechanism 856L may be manually controlled by an operator such as a cameraman or assistant cameraman (commonly called a "focus puller"). When manually controlled, the focus mechanism 856L may include an encoder, potentiometer, or other sensor to provide data indicating the focus distance to the controller 860. The focus mechanism 856L may be adapted to operate under manual control and/or in response to data received from the controller 860.

The left camera platform 830L may include a zoom mechanism 858L to adjust and set the focal length of the left lens 812. The right camera platform 830R may include a zoom mechanism to synchronously adjust and set the focal length of the right lens. The zoom mechanism 858L may include a mechanical, electronic, electrical, or electro-mechanical linkage between the left and right lenses to simultaneously adjust the focal length of both lenses to the same value. The zoom mechanism 858L may include a motor or other actuator adapted to set the focal length in response to data received from the controller 860. The zoom mechanism 858L may be manually controlled by an operator such as a cameraman or assistant cameraman. When manually controlled, the zoom mechanism 858L may include an encoder, potentiometer, or other sensor to provide data indicating the focal length to the controller 860. The zoom mechanism 858L may be adapted to operate either under manual control or in response to data received from the controller 860.

The controller 860 may be coupled to an operator interface 864. The controller 860 may receive data from the operator interface 864 indicating an interocular distance. The controller 860 may receive data from the operator interface 864 indicating a maximum allowable disparity and a maximum object distance indicating the distance from the camera to the furthest object in a scene. The controller 860 may then use the maximum allowable disparity and the maximum object distance to calculate an interocular distance as described in pending application Ser. No. 12/409,316 and pending application Ser. No. 12/578,488, both entitled Stereo Camera with Automatic Control of Interocular Distance. The controller 860 may also receive data from the operator interface 864 indicating the focus distance and focal length of the left and right lenses.

The operator interface 864 may be partially or wholly incorporated into the camera head 862. For example, the focus mechanism 856L and/or the zoom mechanism 858L may be manually controlled by one or more operators such as a cameraman and/or an assistant cameraman. In this case, the focus mechanism 856L and/or the zoom mechanism 858L may provide data to the controller 860 indicating the manually-set focus distance and/or focal length. Similarly, control actuators to set the interocular distance and/or maximum disparity may be located on the camera platform for operation by the cameraman and/or the assistant cameraman.

The operator interface 864 may be partially or wholly incorporated into the controller 860. For example, in situations where the interocular distance and/or the maximum allowable disparity are fixed during the recording of a scene, the interocular distance and/or the maximum allowable disparity may be manually provided to the controller using a keyboard or other data entry device. In situations where one or both of the interocular distance and/or the maximum allowable disparity will be varied during the recording of a scene, interocular distance and/or the maximum allowable disparity may be controlled using, for example, arrows keys on a keyboard or one or more continuous control devices such as a potentiometer, joystick or mouse.

The controller 860 may interface with the camera head 862 and/or with the left and right camera platforms 830L, 830R. The controller 860 may be integrated into the camera head 862. The controller may provide data to and/or receive data from the focus mechanism 856L and the zoom mechanism 858L indicating the focus distance and focal length, respectively, of the left and right lenses.

The controller 860 may provide data to the X1 mechanism 834L and the X2 mechanism 838L (and to the X3 and X4 mechanisms, when present) to set the interocular distance and the convergence angle between the left and right cameras and the location of the pivot axis for each camera. For example, the controller 860 may provide data to the X1 mechanism 834L and the X2 mechanism 838L to set the convergence distance equal to the focus distance of the left and right lenses. For example, the controller 860 may provide data to the X1 mechanism 834L and the X2 mechanism 838L to position the virtual pivot axes based on the focal length of the left and right lenses. The controller 860 may include a memory which stores information relating the locations of the nodal points of the respective left and right lenses to the focal length. The information relating the locations of the nodal points of the respective left and right lenses to the focal length may be in the form of a look-up table, a formula, a mathematical expression, or other data.

Figure 9:
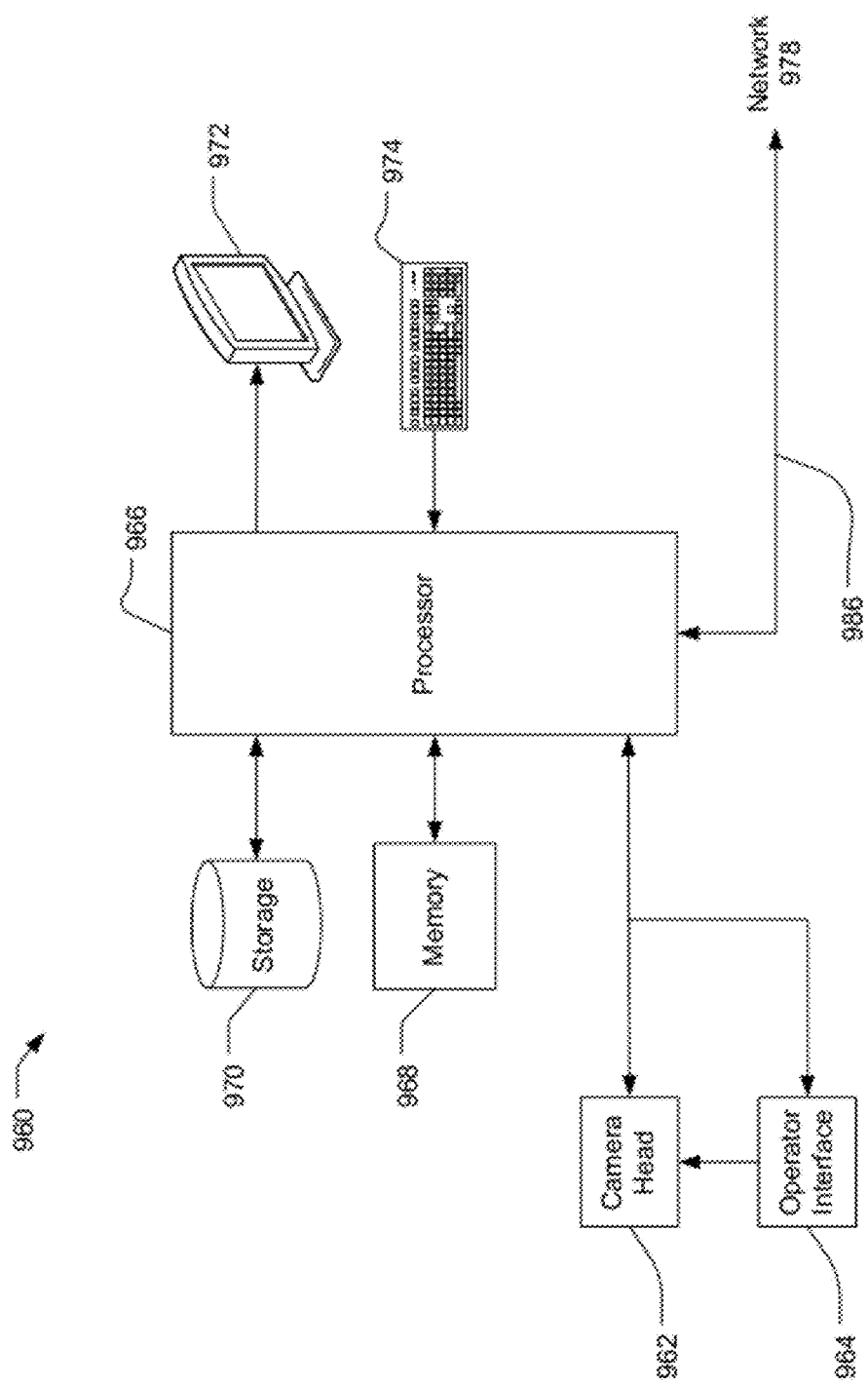
FIG. 9 is a block diagram of a computing device.

FIG. 9 is a block diagram of a computing device 960 that may be suitable for the controller 960. As used herein, a computing device refers to any device with a processor, memory and storage that may execute instructions including, but not limited to, personal computers, server computers, computing tablets, set top boxes, video game systems, personal video recorders, telephones, personal digital assistants (PDAs), portable computers, and laptop computers. The computing device 960 may include hardware, firmware, and/or software adapted to perform the processes subsequently described herein. The computing device may include a processor 966 coupled to memory 968 and a storage device 970.

The storage device 970 may store instructions which, when executed by the computing device 960, cause the computing device to provide the features and functionality of the controller 960. As used herein, a storage device is a device that allows for reading from and/or writing to a storage medium. Storage devices include hard disk drives, DVD drives, flash memory devices, and others. Each storage device may accept a storage media. These storage media include, for example, magnetic media such as hard disks, floppy disks and tape; optical media such as compact disks (CD-ROM and CD-RW) and digital versatile disks (DVD and DVD±RW); flash memory cards; and other storage media.

The computing device 960 may include or interface with a display device 972 and one or more input devices such a keyboard 974. The computing device 960 may also interface with one or more networks 978. The interface 976 between the computing device 960 and the network 978 may be wired or wireless. The network 978 may be the Internet or any other private or public network.

The computing device 960 may also interface with a camera head 962. The computing device 960 may also be coupled to an operator interface 964, either directly or through the camera head 962.

The processes, functionality and features of the computing device 960 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 960 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 966 and others by other devices.

Description of Processes

Figure 10:
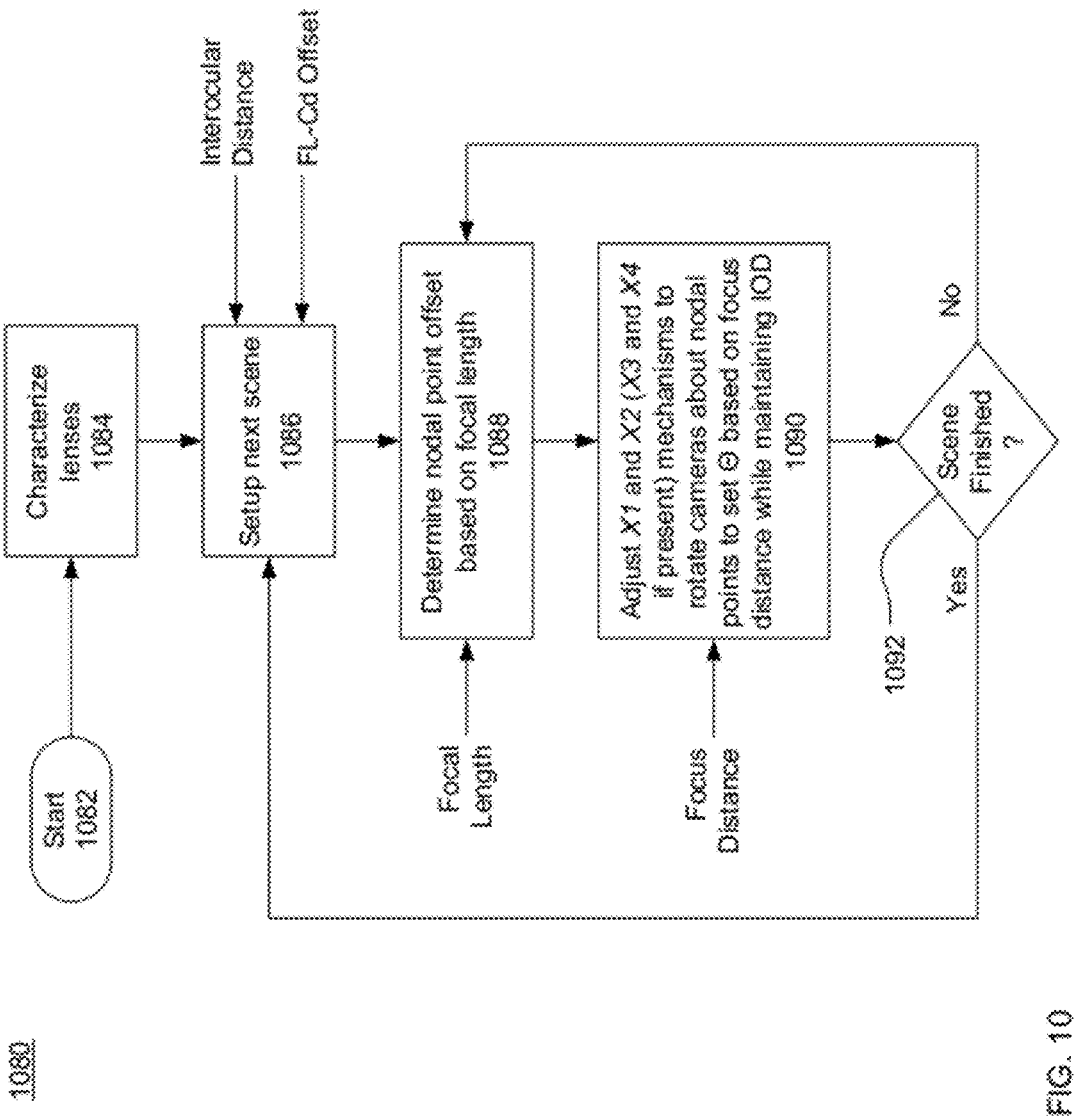
FIG. 10 is a flow chart of a process for recording stereo images.

FIG. 10 is a flow chart of an exemplary process 1080 for recording stereographic images using a stereographic camera system including variable focal length zoom lenses, such as the stereographic camera system 700. Specifically, FIG. 10 is a flow chart of a process for recording a scene or plurality of scenes using the same cameras and lenses. The flow chart has a start 1082 but does not end until the recording of all scenes is completed or the camera lenses are changed. The process 1080 is continuous in nature and the actions within the process may be performed continuously and in near-real time during the recording of each scene.

Within this patent, the phrase "near-real time" means in real time except for processing delays that are very short compared with temporal events in the scene being recorded.

At 1084, the lenses to be used during recording one or more scenes may be characterized to develop information defining the location of a nodal point for each lens relative to the focal length to which the lens is set. For example, each camera may be set up to capture an image of a scene containing reference objects at two or more depths. Each camera may then be repeatedly rotated about a pivot axis while observing the parallax introduced into the image by the camera rotation. The position of the camera may be manually or automatically adjusted to a position where the rotation of the camera does not introduce parallax. At this point, the pivot axis and the nodal point of the camera lens may be aligned. The location of the lens nodal point may be determined for two or more settings of the lens focal length. The information relating the location of a nodal point for each lens to the focal length may be developed in the form of a look-up table, a formula expressing the location of the nodal point as a function of the focal length, or other data.

At 1086, the stereographic camera system may be set up to record a specific scene. The setup may include receiving data to set an interocular distance and a focus distance to convergence distance (FL-CD) offset.

At 1088, data indicating the focal length of the camera lenses may be received and the location of virtual pivot axes for one or both cameras of the stereographic camera system may be set based on the relationship between the lens focal length and the nodal point position as characterized at 1084. The focal length may be changed, or zoomed, during the recording of the scene and the virtual pivot axes locations may be set to be coincident with the nodal points in near real-time throughout the recording of the scene.

At 1090, the convergence angle Θ of the two cameras of the stereographic camera system may be set by both cameras about their respective virtual pivot axes. The virtual pivot axes may not coincide with mechanical rotation axes. The convergence angle Θ may be set by adjusting X1 and X2 mechanisms, and X3 and X4 mechanisms when present, as described in conjunction with FIGS. 4-5, while maintaining the interocular distance defined at 1086. The focus distance may be changed during the recording of the scene and the convergence angle may be set accordingly in near real-time throughout the recording of the scene.

At 1092, a determination may be made if the recording of the scene has been completed. If the recording is ongoing, the process 1080 may repeat continuously and in near real-time from 1088. When the recording of a scene has been completed, the process 1080 may finish at 1098. Subsequently, the process 1080 may start again from 1086 to record another scene.

Figure 11:
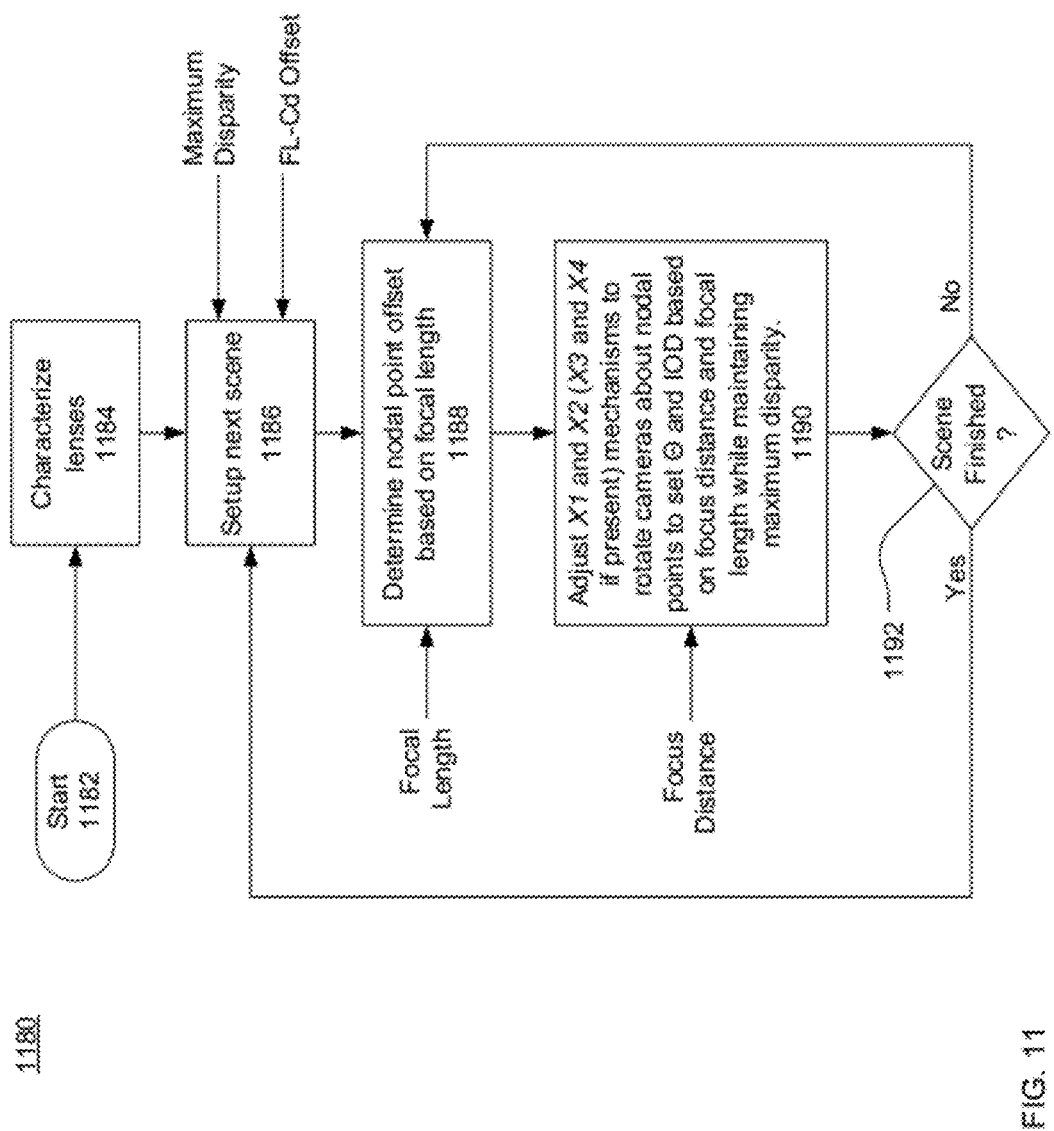
FIG. 11 is a flow chart of a process for recording stereo images.

FIG. 11 is a flow chart of another exemplary process 1180 for recording stereographic images using a stereographic camera system including variable focal length zoom lenses, such as the stereographic camera 600. Specifically, FIG. 11 is a flow chart of a process 1180 for recording a scene or plurality of scenes using the same cameras and lenses. The process 1180 is similar to the process 1080, and only the differences between the process 1180 and the process 1080 will be described.

At 1186, the stereographic camera system may be set up to record a specific scene. The setup may include receiving data to set a maximum disparity and a focus distance to convergence distance (FL-CD) offset.

At 1190, after data indicating a focal length and a focal distance of the camera lenses has been received, a convergence angle Θ and an interocular distance IOD of the two cameras of the stereographic camera system may be set by rotating both cameras about their respective virtual pivot axes. The convergence angle Θ and the IOD may be set by adjusting X1 and X2 mechanisms as described in conjunction with FIGS. 3-5, while maintaining the maximum disparity defined at 886. The focus distance and the focal length may be changed during the recording of the scene and the convergence angle and the IOD may be set accordingly in near real-time throughout the recording of the scene. Pending application Ser. No. 12/409,316 and pending application Ser. No. 12/578,488, both entitled Stereo Camera with Automatic Control of Interocular Distance, describe cameras and methods for setting interocular distance in near-real time to maintain a predetermined maximum disparity.

At 1192, a determination may be made if the recording of the scene has been completed. If the recording is ongoing, the process 1180 may repeat continuously and in near real-time from 1188. When the recording of a scene has been completed, the process 1180 may finish at 1198. Subsequently, the process 1180 may start again from 1186 to record another scene.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. A platform for a stereographic camera system, comprising:
   a base
   a first linear motion mechanism mounted to the base
   a second linear motion mechanism mounted to the base
   a first camera mounting plate rotatably coupled to the first linear motion mechanism at a first rotation axis and rotatably coupled to the second linear motion mechanism at a second rotation axis, the first camera mounting plate configured to mount a first camera such that an optical axis of the first camera intersects the first rotation axis and the second rotation axis a second camera mounting plate mounted to the base, the second mounting plate fixed in position with respect to the base, the second camera mounting plate configured to mount a second camera.

2. The platform of claim 1, wherein
the first linear motion mechanism is configured to vary a first distance between the first rotation axis and an optical axis of the second camera
the second linear motion mechanism is configured to vary a second distance between the second rotation axis and the optical axis of the second camera.

3. The platform of claim 2, wherein
the first camera mounting plate is translatably coupled to the second linear motion mechanism such that the second rotation axis can translate parallel to the optical axis of the first camera.

4. The platform of claim 1, wherein the first camera mounting plate and the second camera mounting plate each comprise:
at least one dovetail rail to capture a mating dovetail rail of the respective camera
a lock mechanism to lock the respective camera to the at least pone dovetail rail.

5. A stereographic camera, comprising:
a base
a first linear motion mechanism mounted to the base
a second linear motion mechanism mounted to the base
a first camera mounting plate rotatably coupled to the first linear motion mechanism at a first rotation axis and rotatably coupled to the second linear motion mechanism at a second rotation axis
a second camera mounting plate mounted to the base in a fixed position with respect to the base
a first camera including a first lens, the first camera attached to the first camera mounting plate such that an optical axis of the first camera intersects the first rotation axis and the second rotation axis
a second camera including a second lens, the second camera attached to the second camera mounting plate.

6. The stereographic camera of claim 5, wherein
the first linear motion mechanism is configured to set a first distance between the first rotation axis and an optical axis of the second camera
the second linear motion mechanism is configured to set a second distance between the second rotation axis and the optical axis of the second camera.

7. The stereographic camera of claim 6, wherein
the first distance is set in accordance with the formula $$X1 = IOD - Y_0 \sin(\Theta)$$

the second distance is set in accordance with the formula $$X2 = X1 + Y \sin(\Theta)$$

wherein X1=the first distance
X2=the second distance
IOD=an interocular distance of the stereographic camera, defined as a distance between a nodal point of the first camera lens and a nodal point of the second camera lens
Θ=a convergence angle of the stereographic camera
Y=a distance from the first rotation axis to the second rotation axis
$Y_0$=an offset distance from the first rotation axis to the nodal point of the first camera lens.

8. A platform for a stereographic camera, comprising:
a left platform, comprising:
a left camera mounting plate
a first linear motion mechanism rotatably coupled to the left camera mounting plate at a first rotation axis, the first linear motion mechanism configured to set a first distance between the first rotation axis and a line of sight
a second linear motion mechanism rotatably coupled to the left camera mounting plate at a second rotation axis, the second linear motion mechanism configured to set a second distance between the second rotation axis and a line of sight
a right platform, comprising:
a right camera mounting plate
a third linear motion mechanism rotatably coupled to the right camera mounting plate at a third rotation axis, the third linear motion mechanism configured to set a third distance between the third rotation axis and the line of sight
a fourth linear motion mechanism rotatably coupled to the right camera mounting plate at a fourth rotation axis, and rotatably coupled to the fourth linear motion mechanism at a fourth rotation axis, the fourth linear motion mechanism configured to set a fourth distance between the fourth rotation axis and the line of sight, wherein
the first and third distances are set in accordance with the formula $$X1 = X3 = 0.5 IOD - Y_0 \sin(\Theta/2)$$

the second and fourth distances are set in accordance with the formula $$X2 = X4 = X1 + Y \sin(\Theta/2)$$

wherein X1=the first distance
X2=the second distance
X3=the third distance
X4=the fourth distance
IOD=an interocular distance of the stereographic camera, defined as a distance between a nodal point of a left camera lens and a nodal point of a right camera lens
Θ=a convergence angle of the stereographic camera
Y=a distance from the first rotation axis to the second rotation axis and from the third rotation axis to the four rotation axis
$Y_0$=an offset distance from the first rotation axis to the nodal point of the left camera lens and from the third rotation axis to the nodal point of the right camera lens.

9. A method for operating a stereographic camera including first and second cameras including respective first and second lenses having respective first and second nodal points, the method comprising:
mounting the first camera to a first camera mounting plate, the first camera mounting plate rotatably coupled to a first linear motion mechanism at a first rotation axis and rotatably coupled to a second linear motion mechanism at a second rotation axis, the first camera mounted such that an optical axis of the first camera intersects the first rotation axis and the second rotation axis
mounting the second camera to a second camera mounting plate, the second camera mounting plate fixed in position with respect to a base
controlling the first and second linear motion mechanisms to collectively set an interocular distance between the first and second nodal points and to set a convergence angle by rotating the first camera about an axis passing through the first nodal point.

10. The method of claim 9, wherein
the first linear motion mechanism is configured to set a first distance between the first rotation axis and an optical axis of the second camera
the second linear motion mechanism is configured to set a second distance between the second rotation axis and the optical axis of the second camera.

11. The method of claim 10, wherein controlling the first and second linear motion mechanisms further comprises:
setting the first distance in accordance with the formula $$X1 = IOD - Y_0 \sin(\Theta)$$

setting the second distance in accordance with the formula $$X2 = X1 + Y \sin(\Theta)$$

wherein $X1$ = the first distance
$X2$ = the second distance
$IOD$ = an interocular distance of the stereographic camera, defined as a distance between a nodal point of the first camera lens and a nodal point of the second camera lens
$\Theta$ = a convergence angle of the stereographic camera
$Y$ = a distance from the first rotation axis to the second rotation axis
$Y_0$ = an offset distance from the first axis to the nodal point of the first lens.

12. A method for operating a stereographic camera including left and right cameras, the left and right cameras including respective left and right lenses having respective left and right nodal points, the method comprising:
mounting the left camera to a left camera mounting plate, the left camera mounting rotatably coupled to a first linear motion mechanism at a first rotation axis and rotatably coupled to a second linear motion mechanism at a second rotation axis
the first linear motion mechanism configured to set a first distance between the first rotation axis and a line of sight
the second linear motion mechanism configured to set a second distance between the second rotation axis and the line of sight mounting the right camera to a right camera mounting plate, the right camera mounting plate rotatably coupled to a third linear motion mechanism at a third rotation axis and rotatably coupled to a fourth linear motion mechanism at a fourth rotation axis
the third linear motion mechanism configured to set a third distance between the third rotation axis and the line of sight
the fourth linear motion mechanism configured to set a fourth distance between the fourth rotation axis and the line of sight
controlling the first, second, third, and fourth linear motion mechanisms to collectively set an interocular distance between the first and second nodal points and to set a convergence angle by rotating the first camera and the second camera about respective axes passing through the respective first and second nodal points, controlling the first, second, third, and fourth linear motion mechanisms further comprising:
setting the first and third distances in accordance with the formula $$X1 = X3 = 0.5 IOD - Y_0 \sin(\Theta/2)$$

setting the second and fourth distances in accordance with the formula $$X2 = X4 = X1 + Y \sin(\Theta/2)$$

wherein $X1$ = the first distance
$X2$ = the second distance
$X3$ = the third distance
$X4$ = the fourth distance
$IOD$ = an interocular distance of the stereographic camera, defined as a distance between a nodal point of the left camera lens and a nodal point of the right camera lens
$\Theta$ = a convergence angle of the stereographic camera
$Y$ = a distance from the first left axis to the second left axis and from the first right axis to the second right axis
$Y_0$ = an offset distance from the first left axis to the nodal point of the left camera lens and from the first right axis to the nodal point of the right camera lens.

* * * * *

UNITED STATES PATENT AND TRADEMARK OFFICE
CERTIFICATE OF CORRECTION

PATENT NO.         : 8,238,741 B2                                       Page 1 of 1
APPLICATION NO.    : 12/752085
DATED              : August 7, 2012
INVENTOR(S)        : Vincent Pace et al.

It is certified that error appears in the above-identified patent and that said Letters Patent is hereby corrected as shown below:

Column 9, line 5: replace "minor" with --mirror--.

Signed and Sealed this
Eleventh Day of September, 2012

David J. Kappos
*Director of the United States Patent and Trademark Office*